TIMING DEVICE

Filed April 3, 1962 6 Sheets-Sheet 1

INVENTORS.
HENRY B. FRIED
JACK SHERMAN

BY

Philip S. Hilbert

ATTORNEY.

TIMING DEVICE

Filed April 3, 1962

INVENTORS.
HENRY B. FRIED
JACK SHERMAN
BY
Philip G. Hilbert
ATTORNEY.

INVENTORS.
HENRY B. FRIED
JACK SHERMAN
BY
Philip S. Hilbert
ATTORNEY

Feb. 12, 1963 H. B. FRIED ETAL 3,077,300

TIMING DEVICE

Filed April 3, 1962 6 Sheets-Sheet 4

INVENTORS.
HENRY B. FRIED
JACK SHERMAN

BY

Philip G. Hilbert

ATTORNEY.

INVENTORS.
HENRY B. FRIED
JACK SHERMAN

BY Philip S. Hilbert

ATTORNEY.

TIMING DEVICE

Filed April 3, 1962 6 Sheets-Sheet 6

INVENTORS.
HENRY B. FRIED
JACK SHERMAN
BY
Philip S. Hilbert
ATTORNEY.

United States Patent Office 3,077,300

Patented Feb. 12, 1963

3,077,300

TIMING DEVICE

Henry B. Fried, 69—53 180th St., Flushing, N.Y., and Jack Sherman, 58—53 246th Crescent, Douglaston, N.Y.

Filed Apr. 3, 1962, Ser. No. 184,897
15 Claims. (Cl. 235—61)

This invention relates to timing devices, and more particularly concerns devices for timing telephone calls and counting corresponding message unit charges on a cumulative basis.

Telephone services within many metropolitan areas are charged on a message unit basis. The overall area is divided into geographical zones and a predetermined number of message units is allotted to various combinations of paired zone calls. Tables of zones and charges are set up, with the charges ranging from 1 to 6 message units. These charges vary in accordance with the distance between the pair of zones concerned, and further, with the length of a particular call.

The stated charges apply to the initial period of the call, usually 4 or 5 minutes, and thereafter overtime charges apply. Overtime charges may be assessed at the rate of 1 message unit for each 1 minute, 2 minute or 3 minute interval or fraction thereof, which follows the initial period. The message units are determined and recorded on a cumulative basis at the subscriber's exchange office for the usual periodic billing. However, the subscriber has no convenient means for timing his calls or independently recording the message unit totals for each call on a cumulative basis within his billing period.

Accordingly, a subscriber may tend to use his phone in excess since he is unaware of the accumulated charges, which may exceed the predetermined minimum number of message units allotted for the given billing period. Alternatively, the subscriber may be unaware of the fact that he is using less than the allotted minimum number of message units. Thus, a subscriber is unable to budget his calls at a selected maximum number of message units.

Accordingly, an object of this invention is to provide a timing device for use by telephone subscribers which will time each call made on a message unit basis and provide a visual count of the total message units incurred, on a cumulative basis; so as to allow the subscriber to budget his calls in terms of excesses or deficiencies in respect to the minimum message units alloted for a given billing period.

Another object of this invention is to provide an improved timing device, which is independent of the telephone instrument; which is manually operated by the user at the commencement and termination of any call based on message unit charges, to accurately count the message units used for such calls and to provide such record visually on a cumulative basis.

A further object of this invention is to provide a device of the character described, which is of relatively simple construction, economical to manufacture, readily operated by the user and is compact as to form so as to allow the same to be advantageously located in relation to a telephone.

Other objects of this invention will in part be obvious and in part hereinafter pointed out.

Figure 1:
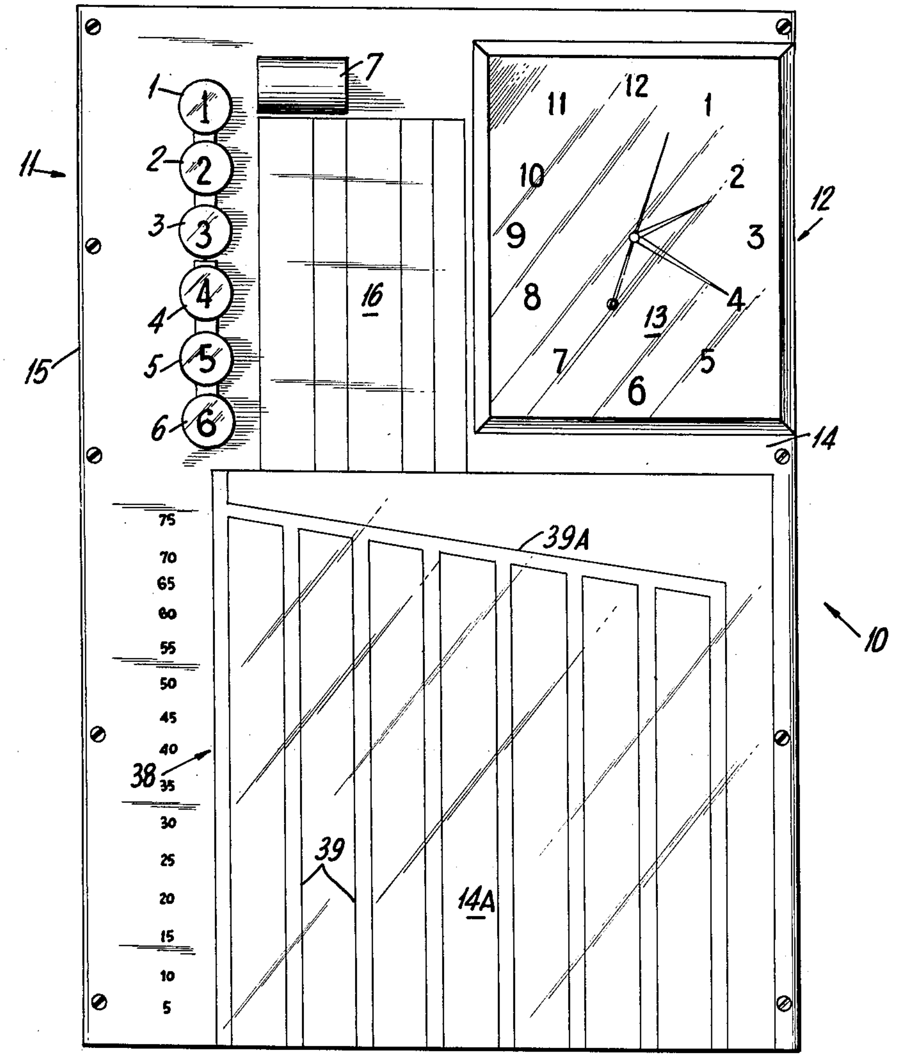
Figure 11:
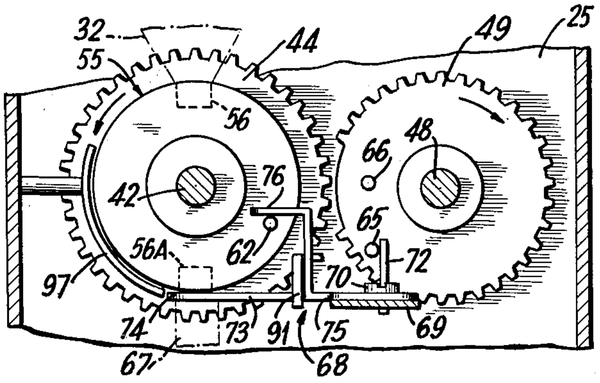
Figure 2:
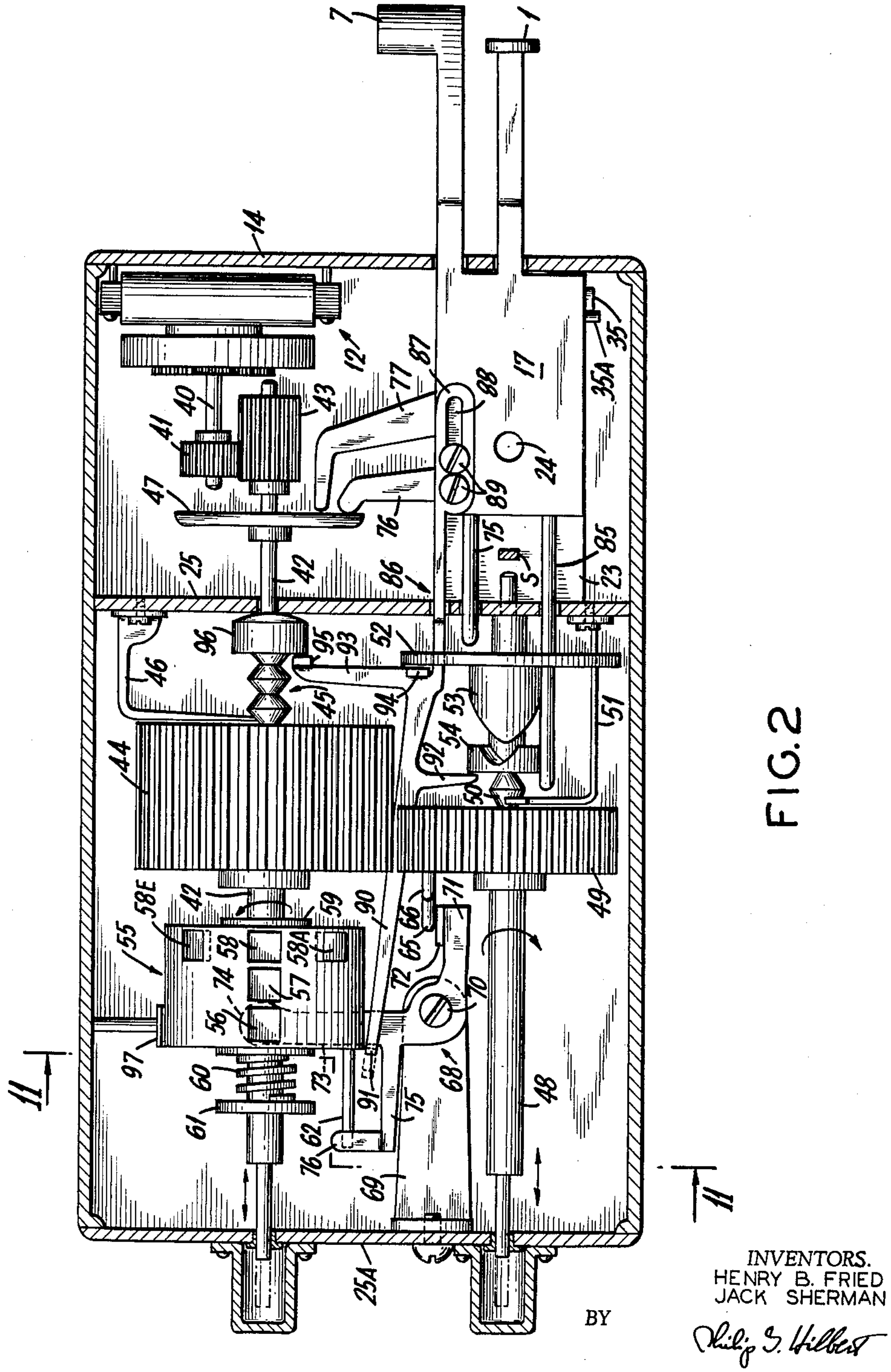
Figure 3:
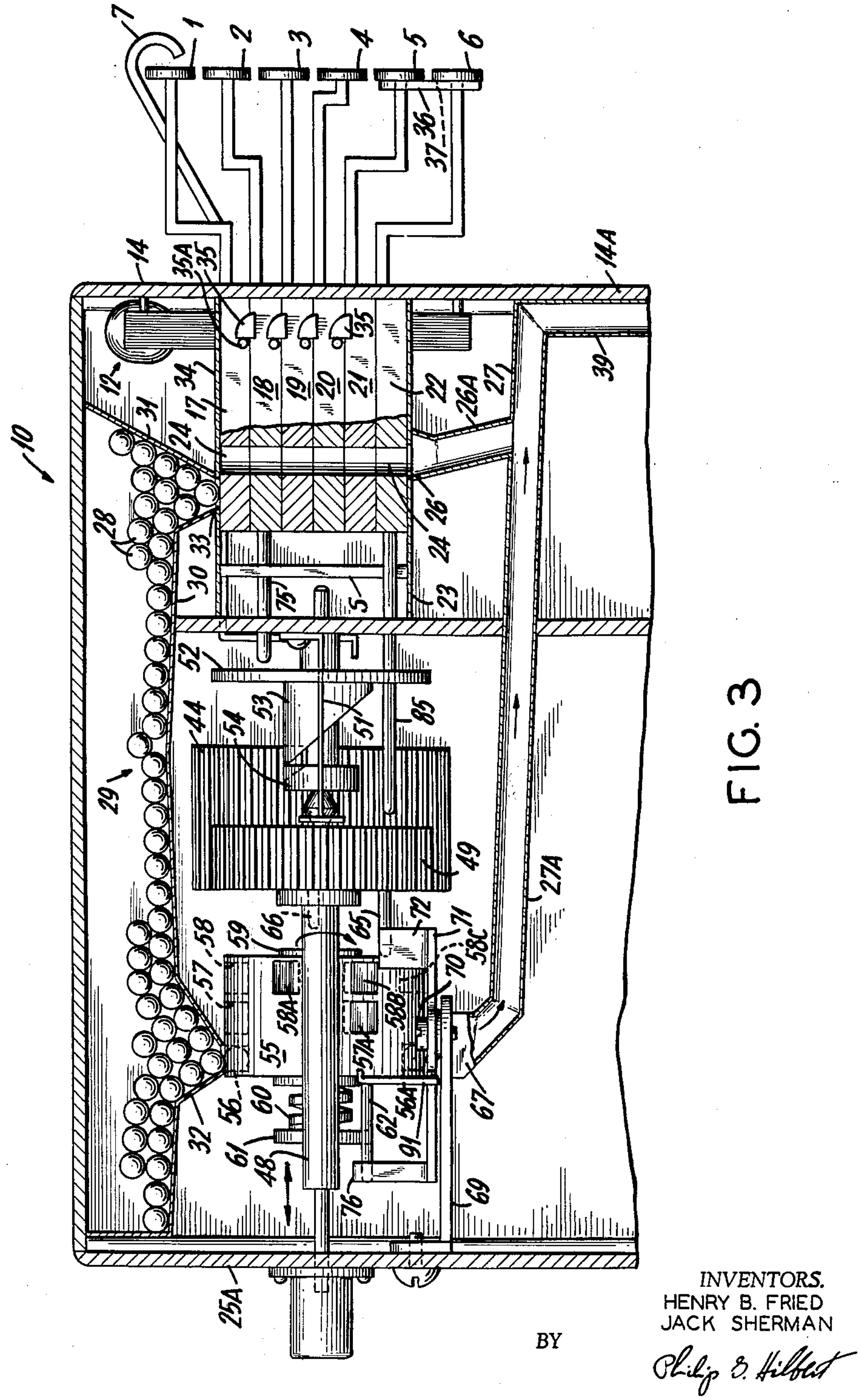
Figures 4, 5, 6:
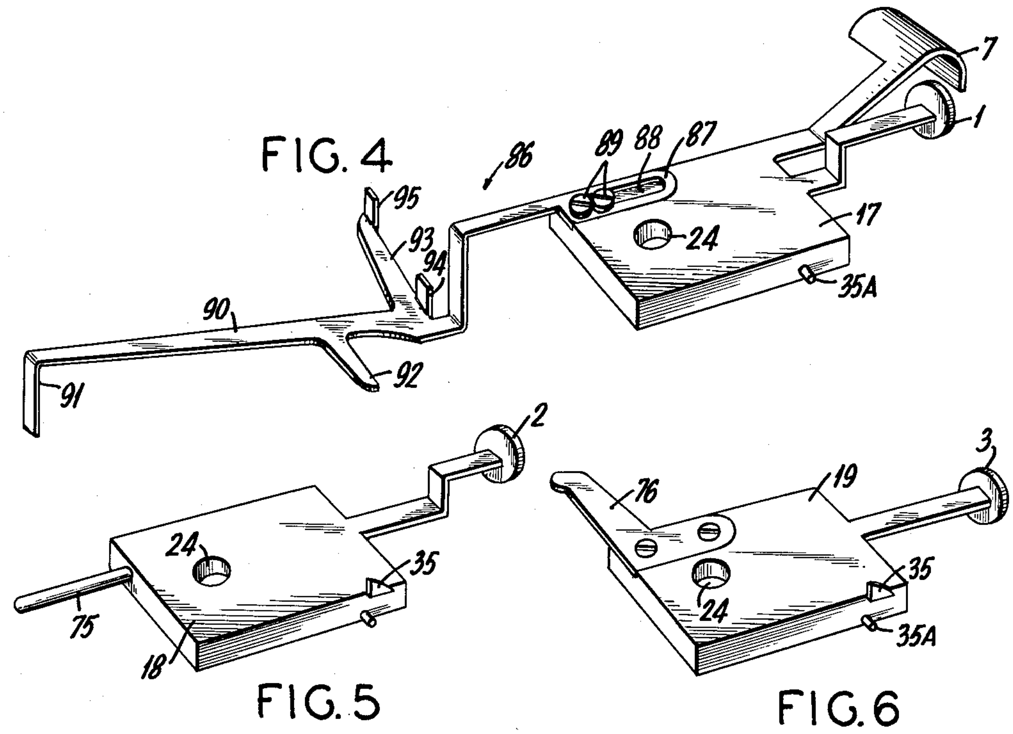
Figure 7:
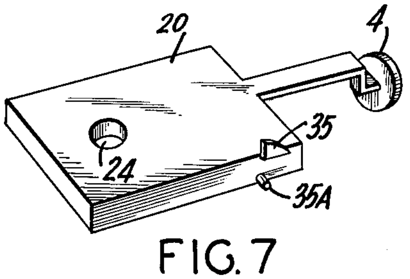
Figure 8:
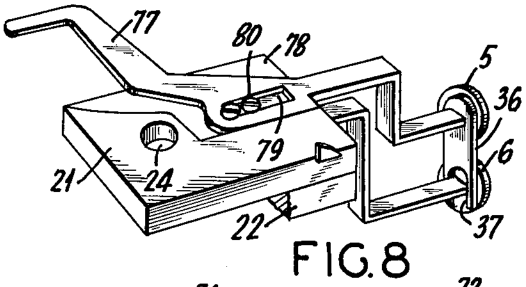
Figures 9, 10:
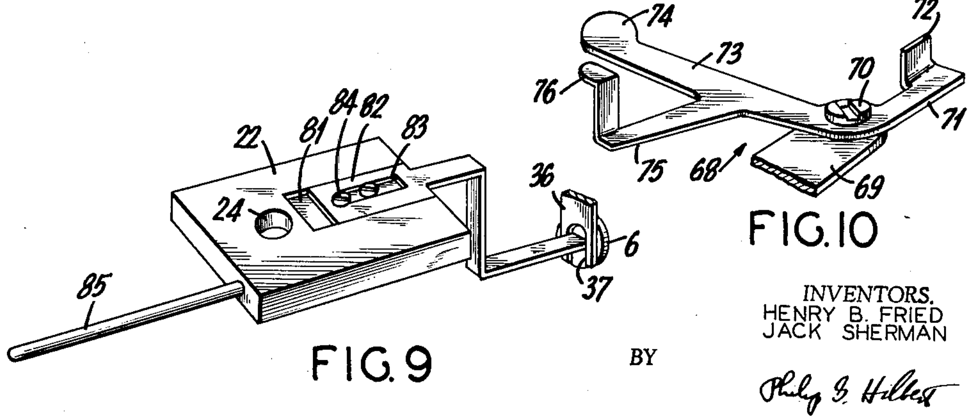
Figure 12:
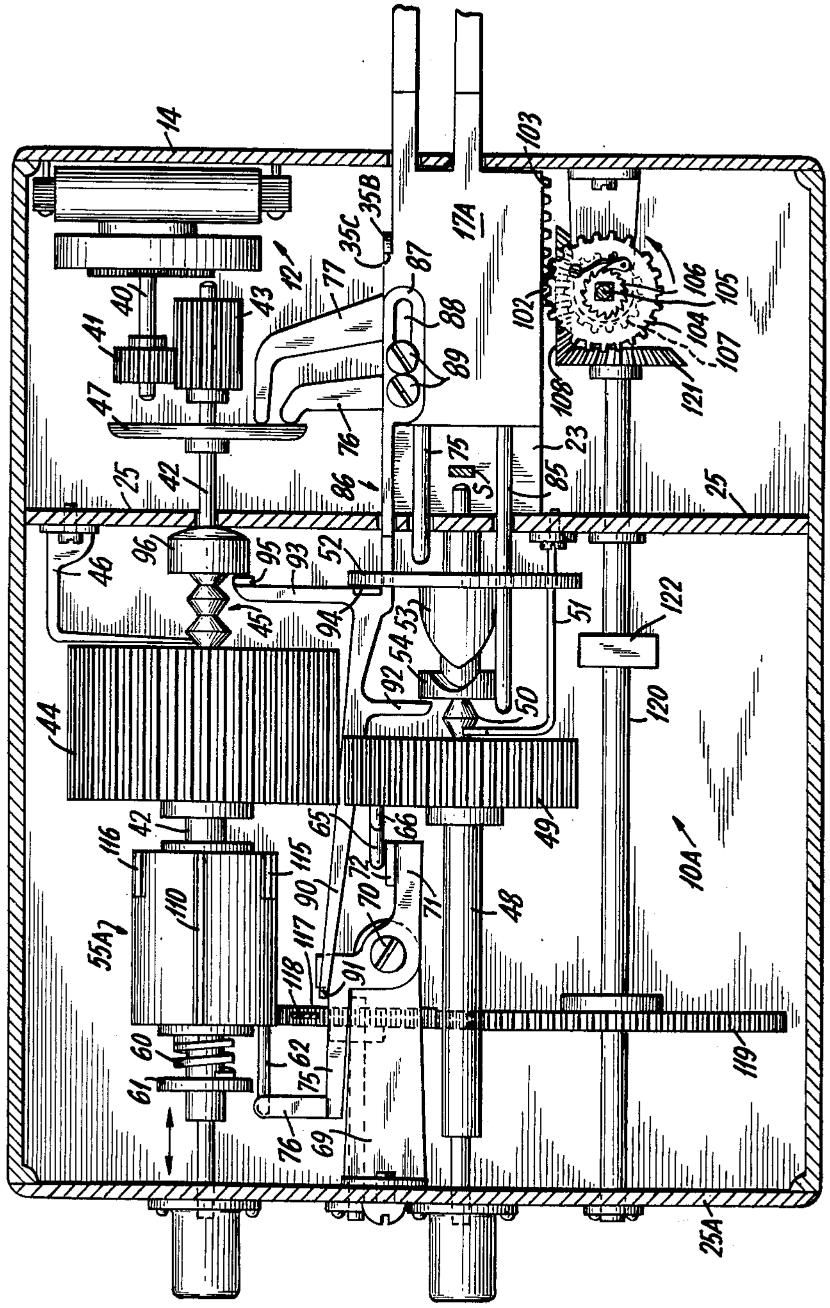
Figures 13, 14:
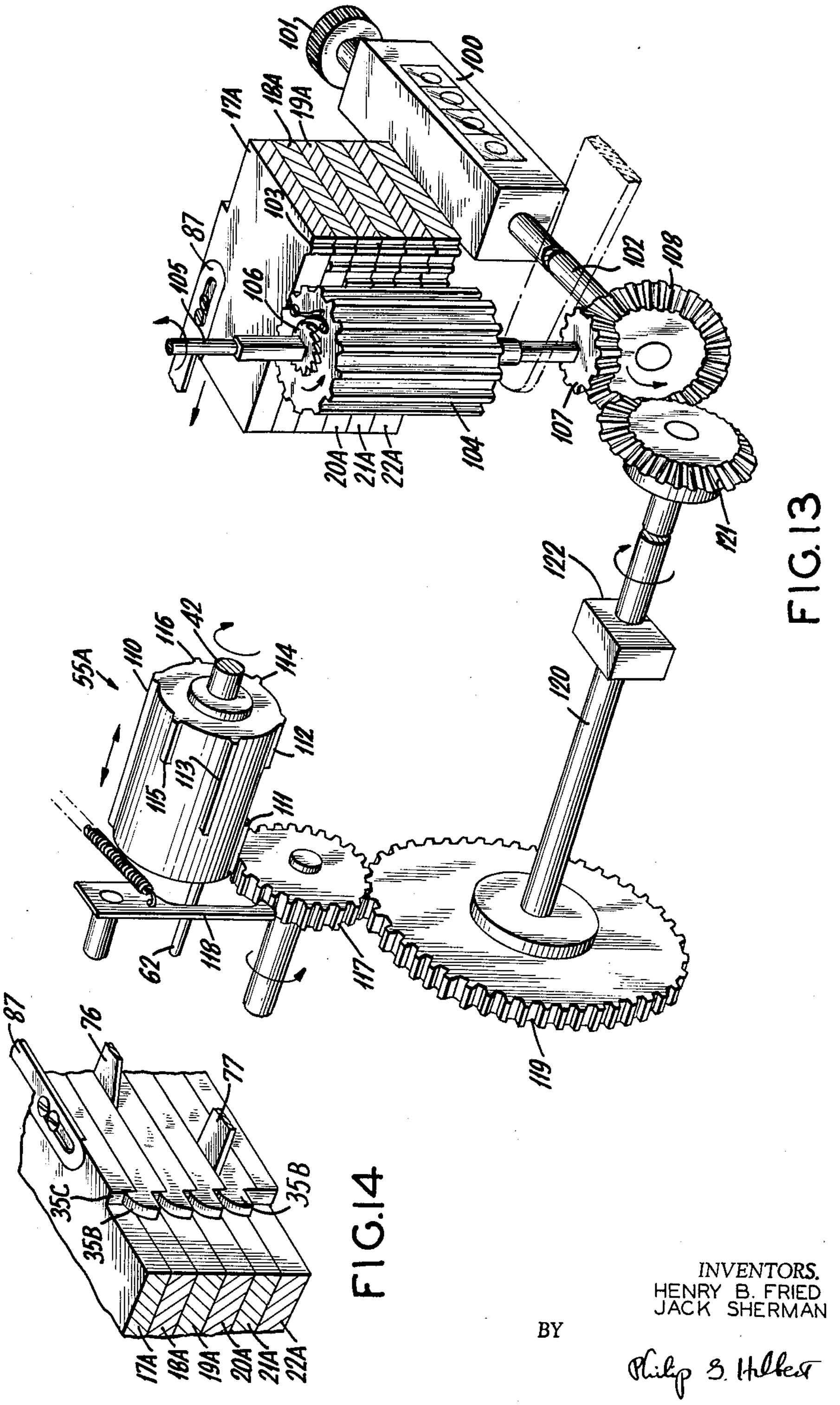

In the drawings, FIG. 1 is a front elevational view of a timing device embodying the invention; FIG. 2 is a top plan view thereof with parts in section; FIG. 3 is a side elevational view thereof, with parts in section and parts broken away; FIG. 4 is a perspective view of a single message unit metering plate and an associated multifunctional operating arm;

FIG. 5 is a perspective view of a two message unit metering plate; FIG. 6 is a perspective view of a three message unit metering plate; FIG. 7 is a perspective view of a four message unit metering plate; FIG. 8 is a perspective view of a five message unit metering plate; FIG. 9 is a perspective view of the six message unit metering plate; FIG. 10 is a perspective view of a multifunction pivoted actuating arm; FIG. 11 is a transverse sectional view taken on the line 11—11 of FIG. 2;

FIG. 12 is a top plan view showing an alternative form of the invention; FIG. 13 is a diagrammatic view in perspective showing the gearing connections thereof; FIG. 14 is a partial perspective view showing a stack of metering plates.

Referring in detail to the drawings, and particularly to FIGS. 1–3, 10 designates one embodiment of the invention. The same comprises a rectangular casing 11 which encloses a conventional 60 cycle A.C. electric clock mechanism indicated at 12 which has its dial 13 forming a portion of front wall 14 of casing 11.

As shown in FIG. 1, dial 13 is located on the upper right hand portion of wall 14. A vertically arranged column of manually operable buttons 1–6 is disposed on the upper left hand portion of wall 14, for the purpose hereinafter appearing. Between buttons 1–6 and dial 13 is a table of zones applicable to a particular subscription area, together with the message units for the initial period to various zones; such table being indicated at 16. A manually operable pull button 7 is located to the right of button 1.

Interiorly of casing 11, as shown in FIGS. 2, 3, there is disposed a vertical stack of six superposed, slidable metering plates 17–22, which are movable through operation of buttons 1–6 respectively; said buttons being connected to the plates by suitable stem portions extending through appropriate openings in wall 14. Pull button 7 is connected to the topmost plate 17 by a stem portion extending through an opening in said wall 14. The bottommost plate 22 is supported on a horizontal partition wall 23 within casing 11.

Each of the plates 17–22 is formed with a small cylindrical through opening 24; said openings being in vertical registry when the plates are in their normal advanced position abutting casing wall 14. Wall 23, which extends from front wall 14 to a vertical partition wall 25 interiorly of casing 11, is formed with an outlet opening 26 which registers with the plate openings 24, when plates 17–22 are in their advanced position. A short conduit 26A extends downwardly from outlet 26 and connects with a horizontal, slightly inclined conduit 27, for the purpose hereinafter appearing.

A quantity of counter elements in the form of small spheres 28 are carried in a reservoir generally indicated at 29 located within casing 11 above plates 17–22. Elements 28 are supported on reservoir wall 30 which includes slightly inclined portions to roll said elements toward a forwardly disposed supply chute 31 or a rearwardly disposed supply chute 32. Chute 31 extends to a supply opening 33 in a horizontal wall 34 overlying the top plate 17; said opening 33 being located rearwardly of plate openings 24 when plates 17–22 are in their advanced position. Opening 33 is of a size to pass a single counter element 28.

Metering plates 17–22 are adapted to provide for concurrent movement of all plates above a selected plate which is being moved by its operating button. To this end, each of plates 18–21 is formed along one side edged thereof with similar lugs 35 projecting above the top surface thereof. Also, each of plates 17–20 is provided with a short pin 35A projecting outwardly of the side edge thereof and disposed in the path of a lug 35 of the underlying plate. Also, plate 21 has affixed to the button shank portion thereof and rearwardly of button 5, a downwardly extending plate 36 with a bifurcated portion 37 which straddles the button shank portion of plate 22 and abuts the rear of button 6 thereof.

When a phone call is to be made, the caller ascertains from table 16 the number of message units for the initial period for the zones involved in the call. With a single unit so allotted, as the phone connection is completed in the usual manner, button 1 on device 10 is pushed inwardly. This locates the topmost metering plate 17 in a position against stop S, so that its opening 24 registers with supply opening 33, allowing a single counter element 28 to pass to plate opening 24.

Assuming further, that the particular phone conversation does not extend beyond the usual initial period (4 or 5 minutes), as the connection is broken, button 7 is manually pulled forward to return plate 17 to its normal position and bringing its opening 24 into registry with the openings 24 of the underlying plates 18–22. The single counter element 28 will then drop through the aligned openings to outlet 26 and to conduit 27.

Conduit 27 connects at its forward end with a register device generally indicated at 38, said device comprising a series of vertically disposed counting racks 39 which are visible through the lower transparent portion 14A of casing wall 14. The racks 39 are connected at their upper ends by a downwardly inclined chute 39A which allows the racks 39 to be filled in succession with counter elements 28 in a cumulative manner. Racks 39 are calibrated to allow the totals of counter elements 28 therein to be seen at a glance.

Again, assuming that a call is to be made which has assigned thereto a message unit value of 2 according to table 16. The procedure described above is repeated except that button 2 is pushed in at the start of the conversation. This causes inward movement of plate 18 and plate 17 will move concurrently therewith due to the engaging action of lug 35 on plate 18 in respect to pin 35A on plate 17. Thus the openings 24 in both plates will register with outlet 33 and will receive two counter elements 28. When pull button 7 is operated at the end of the conversation, plates 17, 18 will be advanced together allowing the two counter elements 28 to pass to register 38, in the manner previously described.

It will be apparent that the movement of any of plates 17–22 through its operating button 1–6 will pass the appropriate number of counter elements 28 to register 38, due to concommitant movement of the operated plate and all plates overlying the operated plate. When button 6 is pushed to move plate 22 inwardly, plate 36 will cause movement of plate 5, which in turn will move plates 1–4 through the lugs 35, pins 35A. Operation of pull button 7 at the end of the conversation, will restore all plates including 6 to their normal position, as forward movement of plate 5 will also move plate 6 through the action of plate 36.

Provision is made for counting and registering message units in the event that a phone conversation exceeds the set initial period (4 or 5 minutes). Normally, overtime is calculated for calls having an initial unit value of 2 or more units, time being unlimited for 1 message unit calls. The overtime rate is usually 1 unit for every three minute interval or fraction thereof, for calls of 2 unit initial rate; 1 unit for every two minute interval or fraction thereof for calls of 3 or 4 unit initial rate; and 1 unit for every one minute interval or fraction thereof for calls of 5 or 6 unit initial rate. However in the case of calls having an initial rate of 6 units, the initial period is usually reduced from 5 minutes to 4 minutes.

Accordingly, device 10 further includes timing means, and means operated from said timing means and responsive to the selected metering plate 17–22 operated at the commencement of the phone conversation, to supply overtime counter elements 28 from reservoir 29 to register 38 in accordance with the overtime rate correlated with the initial unit rate, as indicated above.

To this end, clock mechanism 12 has an output shaft 40 and a pinion 41 thereon for driving a shaft 42 through a gear 43 thereon which meshes with gear 41. Shaft 42 is axially slidable in suitable bearings, not shown, mounted in wall 25 and a wall 25A parallel to wall 25. A gear 44 is fixed to shaft 42 and clock mechanism 12 through meshed gears 41, 43 rotates gear 44 at the rate of a single revolution every 6 minutes. Triple knuckle means 45 on shaft 42, together with one end of an L-shaped spring 46 fixed at its other end to wall 25, allows shaft 42 to be retained in one of three selected axial positions. A positioning disc 47 is affiffixed to shaft 42 adjacent pinion 43.

A shaft 48, parallel to shaft 42, is mounted on walls 25, 25A for axial movement and has fixed thereto a mutilated gear 49 adapted to mesh with gear 44. A double knuckle means 50 on shaft 48, together with one end of an L-shaped spring 51 fixed at its other end to wall 25, allows shaft 48 to be retained in one of two selected axial positions. A cam plate 52 is slidably mounted on shaft 48 and carries a cam 53 for engagement with a cam follower 54 fixed to shaft 48. Thus, upon suitable movement of cam plate 52, cam 53 is advanced on shaft 48 and is effective through a camming action to shift follower 54 and thereby turn shaft 48 to angularly locate gear 49 with toothed portion thereof in meshing engagement with gear 44.

Means is provided for transferring counter elements 28 from reservoir 29 through the rear supply chute 32, at selected rates, to register means 38, in response to the initial operation of a selected metering plate 18–22, to cover any overtime period beyond the usual initial period, as measured and controlled by clock mechanism 12.

To this end, a transfer barrel means 55 is mounted on shaft 42 in clutching relation thereto. Barrel means 55 is formed on its circumference with a series of axially adjacent, circumferentially disposed sets of recesses for respectively receiving single counter elements 28. Thus, at the far end of said barrel means, a pair of diametrically opposed recesses 56, 56A will receive and transfer elements 28 at the rate of 1 every 3 minutes. On an intermediate portion of barrel means 55, a set of three equiangularly related recesses 57, 57A, 57B will receive and transfer said counter elements at the rate of 1 every two minutes. At the near end of barrel means 55, a set of six equiangularly related recesses 58, 58A, etc., will transfer counter elements at the rate of 1 every minute.

A plate 59 fixed to shaft 42 provides limit means for barrel means 55, locating the same with recesses 56, 56A in alignment with chute 32. Barrel means 55 is clutched to shaft 42 for rotation therewith by clutch spring 60 on shaft 42 abutting a collar 61 and one end of said barrel means 55. A pin 62 extending from barrel means 55 provides means for restraining said barrel means from rotation despite the constant rotation of shaft 42 which is driven by clock mechanism 12, when suitable stop means hereinafter described, is moved into a position to engage pin 62.

Gear 49, which measures the usual initial period for phone calls, of five minutes or four minutes, as the case may be, makes a single revolution when meshed with gear 44 by action of cam 53 and follower 54 as described above and is disengaged from gear 44 due to a lack of a few gear teeth on its circumference, when in its normal, home position. Gear 49 has a first, relatively long pin 65 projecting therefrom and located to bring the same to a determined angular position five minutes after the commencement of rotation of said gear. Also, gear 49 has a second, relatively short pin 66 projecting therefrom and located to reach said angular position four minutes after the gear starts to rotate.

The underside of barrel means 55, in each of its selected axial positions relative to the constantly rotating shaft 42, brings its series of recesses 56, 56A; 57, 57A, 57B; or 58, 58A, etc., successively into register with a collecting chute 67 which communicates with a rear portion 27A of conduit 27, thereby passing counter elements 28 from reservoir 29 to the cumulative register 38, at selected time intervals related to each set of said recesses. Thus, overtime charges as well as the initial time charges may be shown on said register 38.

Means it provided for closing off the underside of barrel means 55 until such time as the usual initial time interval has elapsed, to allow the passage of elements 28 to register 38 until the phone conversation is terminated and button 7 is operated. To this end, a multiarm member 68 is provided for pivoted movement on a bracket 69 extending from wall 25A, with a pivot at 70. Member 68 includes an arm 71 having an upstanding lug 72 disposed in the path of pin 65 on gear 49; an arm 73 substantially at right angles to arm 71 and having a closure portion 74 at its outer end for covering chute 67 when arm member 68 is in its normal position as shown in FIG. 2.

Member 68 further includes a third arm 75 extending forwardly from arm 73 and having an upstanding lug 76 adapted to engage pin 62 on barrel means 55 when member 68 is in its normal position, thereby halting rotation of barrel means 55 relative to shaft 42.

Barrel means 55 when left in the position indicated in FIG. 2, will upon rotation during overtime periods, pass counter elements 28 at the rate of one every three minutes. However, when elements 28 are to be passed at the rate of one every two minutes or one every minute, then barrel means 55 is axially shifted on shaft 42 in response to movement of plates 19–22. Also, the rotation of gear 49 is initiated to measure the initial period of either five or four minutes, in response to operation of any one of plates 18–22.

Accordingly, plate 18 is provided with a pusher pin 75 which projects through an opening in wall 25, and upon pushing button 2, pin 75 will move cam plate 52 to engage cam 53 with follower 54 and thereby rotate gear 49 into meshing relation with gear 44. Thus, rotation of gear 49 is started for its single revolution. As the movement of any of plates 19–22 by the appropriate button 3–6 will cause concomittant movement of all plates above the operated plate, as described above, gear 49 will be started through the action of pusher pin 75 in each case.

Plate 19 is provided with a pusher arm 76 projecting from an edge thereof and with the outer end thereof disposed adjacent the rim of positioning disc 47. Upon operation of plate 19 by its button 3, in addition to starting the gear 49 through the action of pin 75 on plate 18, which will move with plate 19; shaft 42 will be shifted axially to locate the recesses 57, 57A, 57B of barrel means 55 in alignment with chute 67. Spring 46 will pass to the middle knuckle of knuckle means 45 to retain shaft 42 in this position.

Plate 20 when operated by its button 4 will move plate 19, as well as plates 17 and 18, thus starting gear 49 and moving barrel means 55 to the same position as described in connection with the operation of plate 19, above. Thus, operation of either plate 19 or 20 will provide the same overtime rate of a counter element 28 every two minutes.

Plate 21 is provided with a pusher arm 77 which projects from an edge of the plate and its outer end is disposed adjacent the rim of positioning disc 47, inwardly of arm 76. Arm 77 is slidably mounted on plate 21 in a recess 78 thereof; a slot 79 in the arm and a guide screw 80 in the slot providing for a lost motion relationship between the arm and the plate. Thus, the operation of button 5 extending from arm 77, will initially move disc 47 to shift shaft 42 and barrel means 55 to a position bringing the recesses 58, 58A, etc. in alignment with chute 67. Thereafter, plate 21 moves inwardly and carries with it the overlying plates 17–20 and starts gear 49 as above described.

In this case, as well as when plate 22 is moved to move plate 21 with it, barrel means 55 will be positioned to pass counter elements 28 at the rate of one every minute to the register means 38. As the shaft 42 is shifted to the left, looking at FIG. 2, the end of spring 46 will pass to the first knuckle of knuckle means 45 to retain shaft 42 in the desired position.

Plate 22 is formed on its upper surface with a rectangular recess 81 and an actuating member 82 terminating in button 6, is slidably mounted in said recess, to provide a lost motion relationship therebetween. A slot 83 in member 82 and a combination retainer, guide and stop screw 84 passing through said slot, properly relates member 82 to plate 22.

Plate 22 is also provided with a push pin 85 extending longitudinally from the rear edge of said plate. Pin 85 passes through openings in wall 25 and cam plate 52 for engaging gear 49 to shift the same to the left, looking at FIG. 2, whereby to locate pin 66 in a position to engage lug 72 of arm 71 to pivot the same upon rotation of gear 49 to a position corresponding to a four minute initial interval, rather than the five minute interval determined by pin 65 on the same gear. As gear 49 and its shaft 48 are shifted by pin 85, the end of spring 51 will pass to the other side of knuckle 50 to retain gear 49 in the desired position during its rotation.

Means is provided for stopping the passage of counter elements 28 to register 38 and to restore the several shifted elements of the mechanism, to their original positions, upon termination of the phone conversation, as indicated by the operation of button 7, as the same is pulled forwardly to restore the plates 18–22, which were retracted, to their normal positions.

To this end there is provided a member 86, as shown in FIG. 4, which is mounted on plate 17 and has a lost motion relationship thereto. Member 86 comprises a slotted arm portion 87 disposed in a recess 88 in plate 17 and provided with guide and stop screws 89 passing through the slot thereof into the recessed portion 88 of said plate. Extending from arm portion 87 is a downwardly offset arm portion 90 which terminates in a lug 91.

The rear portion of member 86 passes through appropriate openings in wall 25 and plate 52 to locate lug 91 in engaging relation with arm 73 of pivot member 68, when member 68 is in its normal position as shown in FIG. 2. Member 86 further includes transversely disposed arm portions 92, 93 extending from opposite sides thereof, as shown in FIG. 4. Arm portion 92 engages cam follower 54. Arm portion 93 comprises a pair of upstanding lugs 94, 95 which are positioned to engage plate 52 and a disc 96 fast on shaft 42, respectively.

The normal operation of plate 17 through its button 1 will leave member 86 undisturbed through the lost motion connection thereof with said plate. However, operation of any of plates 18–22 will cause pivoted movement of member 68 and thereby move member 86 through lug 91, to an advanced position. When any of said plates 18–22 is then restored to its original position, plate 17 is moved therewith and will thus retract member 86 to its normal position. This in turn will effect retraction of shaft 42, shaft 48 and plate 52 and restore pivot member 68 to its normal position to close chute 67.

Thus when button 1 of device 10 is operated with the commencement of a single message unit call, no overtime charges are involved, and the movement of plate 17 merely delivers a single counter element 28 to register 38, as above described, without actuating the overtime components of the device.

When button 2 is operated for a two message call, and if the initial period of five minutes is exceeded, then in addition to passing the two counter elements 28 to register 38, the movement of the plate 18 is operative to start the rotation of gear 49 and to allow for rotation of barrel means 55 at the end of the five minute interval to pass counter elements 28 to register 38 at the rate of one every three minutes, since the barrel means is already located to register its recesses 56, 56A with chute 67, until button 7 is operated to stop the passage of said counter elements and to restore the shifted elements to their normal position.

Similarly, when button 3 is operated for a three message call, and overtime is involved, gear 49 is started on its single revolution, as above and further, shaft 42 is shifted by pusher arm 76 on plate 19, to locate recesses 57, 57A and 57B in registry with chute 67 to passcounter elements 28 at the rate of one every two minutes. Operation of button 4 provides operation similar to that incident to button 3, and passes overtime counter elements at the same rate.

When button 5 is operated for a five message call, the operation is as above described, except that pusher arm 77 on plate 21 becomes operative to shift shaft 42 to bring barrel recesses 58, 58A, etc., in registry with chute 67, to pass counter elements 28 at the rate of one every minute, to register 38. The operation of button 6 provides a similar operation, except that movement of plate 22 is operative through its pusher pin 85 to make gear 49 operative at the end of a 4 minute initial interval to start barrel means 55 to pass counter elements 28 at the same rate of one every minute.

In all cases, the operation of button 7 coincident with the termination of the call, stops the passage of overtime counter elements 28 by moving pivot member 68 to its shutoff position and restores all shifted members to their original positions, and stops the rotation of barrel means 55. Thus, the movement of plate 17 and associated member 86 acts to shift shaft 42 through its lug 95 and shaft 48 through its arm 92; and to pivot member 68 through lug 91 on its arm 90, to thereby effect movement of closure portion 74 to its shut off position and to move arm 75 to a position to stop rotation of barrel means 55 through engagement of lug 76 with pin 62 on said barrel means.

The lost motion relationship of pusher arm 77 on plate 21 and of actuating member 82 on plate 22, allows for extended axial displacement of shaft 42 to locate recesses 58, 58A, etc. on barrel means 55 in proper relation to chute 67, and to allow for displacement of shaft 48 to properly locate pin 66 on gear 49 relative to lug 72 on arm 71 of member 68.

A shield member 97 about barrel means 55 is disposed to retain counter elements 28 in the recesses thereof as said barrel means rotates to discharge the same to chute 67. Casing 11 includes removable top and bottom wall portions, not shown, to allow the counter elements 28 to be removed from the racks 39 and returned to reservoir 29, at the end of each month or other counting period.

The counter elements 28 pass to racks 39 by way of conduit 27, 27A which communicates with the first vertical rack 39 on the left, looking at FIG. 1. When such first rack 39 is filled to the top with accumulated counter elements 28, the next counter element 28 passes by way of inclined chute 39A to the next adjacent vertical rack 39 which when filled, allows the remaining racks 39 in succession to be filled in a similar manner. The calibrated markings shown at the left of the first rack 39, and inscribed on casing wall 14A, allows the total number of counter elements in said rack 39 at any given time, to be visually counted. The casing wall 14A may be similarly marked for each of the other racks 39.

An alternative embodiment of the invention is shown in FIGS. 12–14. Device 10A, is similar to device 10 except as described below.

In place of counter elements 28 and the rack type of register 38, there is provided an accumulative digital register generally indicated at 100 of the gear type, having the usual "0" reset knob 101 and having an actuating shaft 102; the same being suitably mounted on wall 14 of casing 11. The vertical stack of manually operable plates 17A–22A, is similar to plates 17–22, except that the openings 24 of plates 17–22 are omitted, and in lieu thereof, each plate 17A–22A is formed on one side edge thereof with rack gear teeth 103.

Thus, plate 17A, has a single tooth 103; plate 18A, two teeth 103, etc. to plate 22A which has six teeth 103. Suitable gearing interconnects the actuating shaft 102 of register 100, with teeth 103 of plates 17A–22A, comprising a vertically disposed master gear 104 on a shaft 105 with a pawl and ratchet interconnection 106 therebetween. Rack gear teeth 103 mesh with gear 104 upon operation of buttons 1–6 to move the respectively associated plates 17A–22A; the angular extent of rotation of gear 104 being related to the particular plate moved and the corresponding digital value being indicated on register 100, through gearing connecting shaft 105 with shaft 102, and comprising meshing bevel gears 107, 108.

Thus, operation of buttons 1–6 will register the respective message unit values on register 100, for the usual initial five minute period. When plates 18A–22A are operated, and overtime units are to be accumulated, supplemental timed means is adapted to operate register 100.

To this end, shaft 42 carries a time rate barrel 55A which is clutched to the shaft in a manner similar to that described in connection with barrel means 55. Barrel 55A is provided with gear teeth of a character and location such as to provide three longitudinally related sets thereof at 180°; 120° and 60° intervals respectively. Thus, barrel 55A is formed with a single tooth 110 extending the full length of the barrel; a pair of medially interrupted teeth 111, 112 displaced 180° from tooth 110; a pair of teeth 113, 114 displaced 120° from each other and from tooth 110; and a pair of teeth 115, 116 respectively displaced by 60° from tooth 110.

It will be apparent from a consideration of FIG. 13, that barrel 55A provides three sets of teeth, which upon suitable shift of shaft 42, as previously described, through operation of plates 18A–22A, are selectively engageable with a transfer gear 117 with an associated pawl 118, which gear 117 meshes with a gear 119 to rotate shaft 120, and thereby rotate bevel gear 121 which meshes with gear 108.

Thus, overtime periods are counted on register 100 at the rate of one for every three minutes; two minutes or one minute, depending on the axial position of barrel 55A. Suitable ratchet means 122 on shaft 120 allows shaft 120 to drive actuating shaft 102 when barrel 55A is operative, yet permits gear 104 to drive shaft 102 in response to movement of any of plates 17A–22A while gears 119, 117 are disconnected therefrom.

It is understood that the remaining components of device 10A are quite similar to corresponding components of device 10; the interconnection of plates 17A–21A being somewhat modified as shown in FIG. 14, wherein projections 35B engage recessed edge portions 35C on the overlying plate to provide concomitant movement of all plates overlying the actuated plate, in either direction, as previously described.

Barrel 55A is restrained against rotation in the initial period by engagement of lug 76 with pin 62 on said barrel; and is allowed to rotate with shaft 42 when the overtime period starts and lug 76 is displaced from its stop position. The five minute and four minute initial periods are determined in the manner previously described by way of gear 49 and its pins 65, 66.

The plates 17A–22A are adapted to be moved a sufficient distance to insure engagement of all of the teeth 103 thereon with gear 104 and stop means S may limit the travel of said plates. When plates 17A–22A are returned to their original positions, gear 104 is rotated in the opposite direction but its rotation is not passed on to register shaft 102 due to action of ratchet 106.

In device 10, the movement of plates 17–22 is limited by stop S so as to bring the openings 24 in plates 17–22 in proper alignment with supply opening 33, to pass elements 28 to said plate openings.

Having thus described our invention, we claim as new and desire to protect by Letters Patent:

1. A telephone message unit counting device comprising accumulative digital register means, timing means, a plurality of movable members having different digital values respectively associated therewith, means responsive to the movement of a selected movable member to actuate said register means to count the digital value associated with the selected movable member, and means controlled by said timing means and operative after the termination of a predetermined time interval measured by said timing means to further actuate said register means to count additional unitary digital values at predetermined time intervals.

2. A device as in claim 1 wherein said last mentioned means comprises a plurality of sets of means for selectively actuating said register means at different uniformly successive time intervals rsepectively, and means responsive to the movement of a selected movable member for making operative one of said sets of actuating means associated with the said selected movable member.

3. A device as in claim 1 wherein said register means comprises gear operated digital indicating means.

4. A device as in claim 1 wherein said register means comprises similar counter elements and rack means for holding said counter elements.

5. A digital counting device comprising cumulative digital register means, timing means, manually operable means for actuating said register means to register initial selected digital values, first means controlled by said timing means and responsive to said manually operable means for measuring a predetermined initial time interval, second means controlled by said first means for actuating said register means at successive time intervals after the termination of said initial time interval to count on said register means supplementary digital values.

6. A device as in claim 5 wherein said first means comprises means for measuring a plurality of different initial time intervals, said manually operable means comprising a plurality of movable members, and means on said movable members for controlling the operation of said first means to measure a selected initial time interval associated with the operation of the selected movable member.

7. A device as in claim 6 wherein said plurality of movable members comprises a vertical stack of plates, means for selectively moving said plates, and interengageable means on said plates for concommitantly moving all plates above the selected plate upon movement of said selected plate.

8. A device as in claim 7 wherein said plates are selectively moved in one direction at the commencement of an overall time interval including said initial time interval, and are moved in the opposite direction at the end of said overall time interval, and means responsive to the movement of a selected plate in said opposite direction to render said second means inoperative.

9. A digital counting device comprising cumulative digital register means, timing means, a plurality of manually, selectively movable members, means responsive to the movement of a selected member to register a digital value on said register means which is associated with said selected member, means controlled by said timing means for measuring a predetermined initial time interval, means for actuating said register means for counting on said register means supplemental digital values at different time rates, means controlled by said initial time interval measuring means for rendering said register actuating means operative after the termination of said initial time interval, and means responsive to the operation of a selected movable member to control the operation of said register actuating means to select the rate at which supplemental digital values are registered on said register means.

10. A digital counting device comprising cumulative digital register means, timing means, a plurality of movable members, means responsive to the movement of a selected member to register a predetermined digital value associated with the selected member on said register means, first means controlled by said timing means for measuring a predetermined initial time interval, second means controlled by said first means for actuating said register means to count thereon supplemental digital values at the commencement of successive time intervals after the termination of said initial time interval, and third means operable at the end of an overall time interval including said initial time interval for rendering said second means inoperative.

11. A digital counting device comprising cumulative digital register means, timing means, a plurality of manually movable members, means responsive to the movement of a selected member to register a predetermined digital value associated with the selected member on said register means, said timing means comprising first gear means rotating at a constant rate of speed, single revolution gear means engageable with said first means for measuring a predetermined initial time interval, means for engaging said second mentioned gear means with said first gear means in response to the movement of any of said movable members, means for registering supplemental digital values on said register means, means on said second mentioned gear means for rendering said supplemental digital registering means operative upon the termination of said initial time interval, and means responsive to the movement of selected movable members to control the time rate of operation of said supplemental digital registering means in accordance with selected time rates associated with said movable members.

12. A device as in claim 11 wherein said second mentioned gear means comprises means for rendering said supplemental digital registering means operative upon the termination of an initial time interval different from said first mentioned initial time interval in response to the movement of a selected movable member.

13. A device as in claim 11 wherein said last mentioned means comprises a time rate member actuated by said timing means and movable to selected operating positions, said time rate member comprising a plurality of sets of means for actuating said supplemental digital registering means at successive time intervals of different values in accordance with the selected operating position of said time rate member corresponding to a selected set of said actuating means.

14. A device as in claim 11 wherein said register means comprises a gear operated device, gear means on each of said movable members, gearing means connecting said gear operated device with said movable members to actuate said device in response to movement of a selected movable member, said supplemental digital registering means comprising gear rate means rotatable about an axis and shiftable longitudinally of said axis, said gear rate means comprising a plurality of sets of longitudinally related gear teeth at uniform angular spacings, the spacing of one of the said sets of gear teeth being different from that of the other sets of gear teeth, gearing means connecting said gear operated device with said gear rate means in selected longitudinal positions thereof, and means responsive to the movement of selected movable members to shift said gear rate means to a selected longitudinal position thereof.

15. A device as in claim 11 wherein said register means comprises vertical racks for holding counter elements, reservoir means for carrying counter elements, said movable members comprising means for passing a selected number of counter elements from said reservoir to said racks in accordance with the operation of a selected movable member, and said supplemental digital registering means comprising metering means for passing additional counter elements from said reservoir to said racks.

References Cited in the file of this patent

UNITED STATES PATENTS

| | | |
|---|---|---|
| 1,568,272 | Diago | Jan. 5, 1926 |
| 2,143,735 | Kirton | Jan. 10, 1939 |
| 2,911,144 | Lee et al. | Nov. 3, 1959 |
| 3,021,057 | Placke et al. | Feb. 13, 1962 |